United States Patent [19]

Oldford

[11] 4,198,077
[45] Apr. 15, 1980

[54] TWO-PIECE FITTING ASSEMBLY

[75] Inventor: William G. Oldford, Lexington, Mich.

[73] Assignee: Huron Tool & Manufacturing, Division of U. S. Industries, Inc., Lexington, Mich.

[21] Appl. No.: 933,659

[22] Filed: Aug. 14, 1978

Related U.S. Application Data

[62] Division of Ser. No. 761,235, Jan. 21, 1977, Pat. No. 4,128,264.

[51] Int. Cl.² .............................................. F16L 33/18
[52] U.S. Cl. ...................................... 285/21; 285/238
[58] Field of Search .................... 285/21, 382.4, 382.5, 285/238, 334.5, 280, 281, 41

[56] References Cited

U.S. PATENT DOCUMENTS

| | | | |
|---|---|---|---|
| 2,006,139 | 6/1935 | Arthur | 285/382.5 X |
| 2,230,881 | 2/1941 | Browne | 285/41 X |
| 2,542,701 | 2/1951 | Press | 285/382.4 X |
| 2,570,406 | 10/1951 | Troshkin et al. | 285/281 |
| 3,030,253 | 4/1962 | St. John et al. | 285/238 X |
| 3,408,098 | 10/1968 | Wilson | 285/334.5 X |
| 3,784,235 | 1/1974 | Kessler et al. | 285/DIG. 22 X |

FOREIGN PATENT DOCUMENTS

| | | | |
|---|---|---|---|
| 1552227 | 11/1968 | France | 285/382.4 |
| 44-26547 | 6/1969 | Japan | 285/280 |

*Primary Examiner*—Thomas F. Callaghan
*Attorney, Agent, or Firm*—Harness, Dickey & Pierce

[57] ABSTRACT

The fitting assembly embodies a pair of fittings, one of which is in the nature of a union having a thread on one end, a head on the other end and an axially disposed through aperture which has an enlarged central section provided with a sealing shoulder on the end. The second fitting is in the nature of metal or plastic tube which has a locking end divided into four quarters which permits the end sections to contract when advanced into the aperture and to expand into the central opening to form an anchor and a seal with an O-ring on the tube end when compressed on the sealing shoulder. The assembled fittings may, if desired, be rotatable relative to each other so that the union can have the thread rotated, via a tool engaged with a suitable wrenching surface, in the threaded aperture to which it is to be connected and the second fitting turned to have its end mated with an element to which it is to be joined.

3 Claims, 4 Drawing Figures

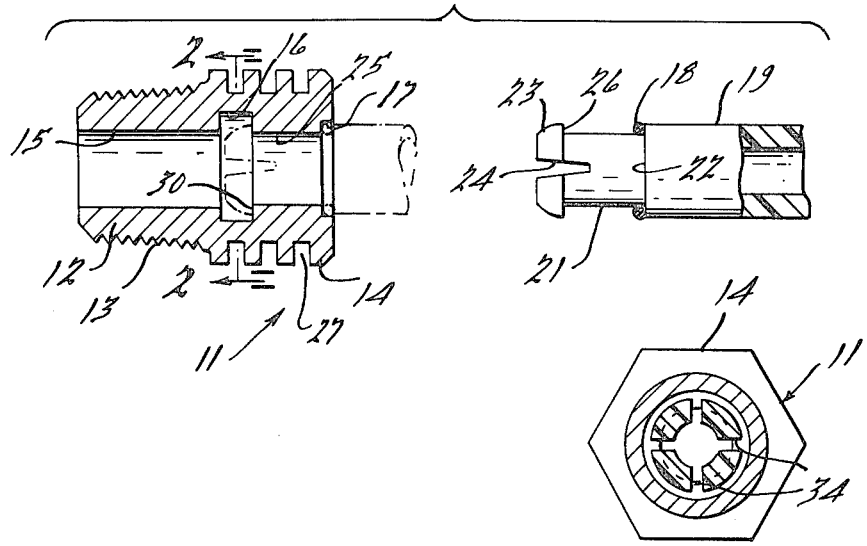
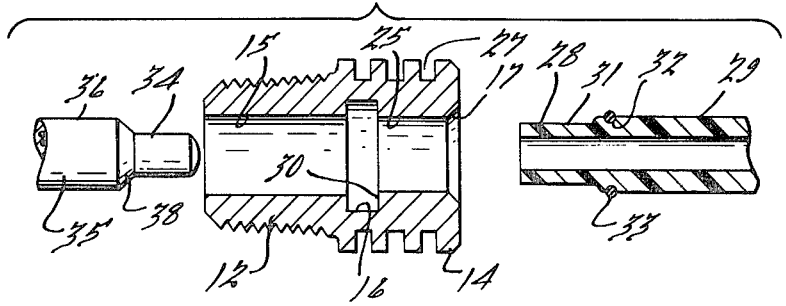
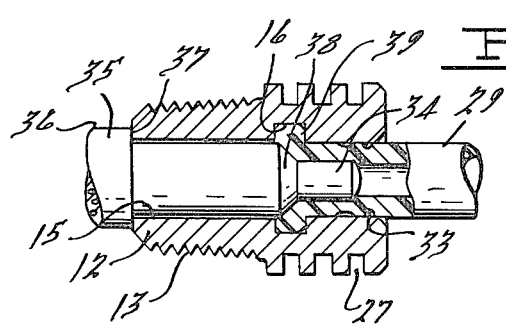

TWO-PIECE FITTING ASSEMBLY

This is a division of application Ser. No. 761,235, filed Jan. 21, 1977 now U.S. Pat. No. 4,128,264.

BACKGROUND OF THE INVENTION

While various fittings have been put together heretofore and joined by solder or adjustable fittings, it is believed the new fitting assembly is an advancement in the art and novel over the known fitting assembly art.

SUMMARY OF THE INVENTION

The two fittings which go to make up the assembly of the present invention are unique in having them joined together in a manner to be disposed in sealed relation and permitted to rotate relative to each other. The first fixture is in the nature of a union being made of metal, although plastic or other substance could be substituted, with an outer thread on one end and a hexagon head on the other end. The thread is preferably of the pipe thread type which tapers so that it will form a seal when secured to a female pipe thread. The hexagon-shaped head permits the threads to be set under pressure so as to be sealed and a plurality of radial slots are provided in the head to induce cooling when the head is threadably connected to a high temperature structure. The second fitting is preferably in the nature of a tube which carries a fluid to a device or element and this is attached in a manner which will produce a seal with the union fitting and to lock the end of the tube within the aperture through the union.

The aperture is of a diameter to receive the tube and is enlarged inwardly from the end to receive a head on the tube end which is divided into quarters or other number of sections to permit it to contract when passing through the aperture into the enlarged area where it expands and forms an anchor. At the same time the head is forced into the aperture end an O-ring on the tube end is engaged against a shoulder at the end of the aperture to form a seal.

BRIEF DESCRIPTION OF THE DRAWING

FIG. 1 is an exploded view of the two fittings assembly embodying the present invention before disposed in assembled relation;

FIG. 2 is a sectional view of the structure illustrated in FIG. 1. after the two fittings are in assembled relation;

FIG. 3 is a view of structure similar to that illustrated in FIG. 1, showing another form of the invention, and FIG. 4 is a sectional view of the structure illustrated in FIG. 3, after the two fittings are in assembled sealed relation.

DESCRIPTION OF THE PREFERRED EMBODIMENTS

FIGS. 1 and 2 disclose a fitting 11 in the nature of a union having an end 12 containing a thread 13 which may be of the N.P.T.F., N.P.S.F. or the like and herein illustrated as a tapered thread (N.P.T.F.) having a hexagon or similar wrench engageable head 14 on the opposite end with an aperture 15 extending through the center. The aperture is enlarged at 16 and has a counterbore 17 at the outer end which engages an O-ring 18 on a tube 19 which forms the second fitting which is attachable to the fitting 11. The tube or fitting 19 has a reduced end portion 21 which provides a recess 22 into which the O-ring 18 seats with a securing head 23 on the outer end which is divided into four quarters by slots 24. The slots are of such thickness that the sections of the head 23 can collapse when inserted into the end portion 25 of the aperture 15 so that it will pass therethrough into the area of greater diameter 16 where the sections may expand to have the locking surfaces 26 engage the shoulder 30 while having the O-ring 18 engaged in sealed relation with the counterbore 17 at the end of the fitting 11. This maintains the fitting or tube 19 sealed to the fitting 11 with the fittings being rotatable, if desired, relative to each other. This permits the fitting 11 to be screwed into position or tightened without interferring with the fitting 19 which may be employed, for example, to conduct vacuum pressure from the intake manifold or an automobile engine. It will be noted that slots 27 are cut radially in the hexagon head 14 which are used for circulating air which conducts heat away from the fitting assembly when such heat removal is desired. It will be appreciated, of course, that the fitting will find universality of other applications in conducting a wide variety of alternative fluids, i.e., liquids as well as gases.

In FIGS. 3 and 4, a further form of the invention is illustrated that wherein the same fitting 11 in the shape of a union is employed with a fitting or tube 29 of different construction. The end 28 of the tube is reduced at 31 and an annular recess 32 is provided in the body adjacent to the end in which an O-ring 33 is secured. The counterbore 17 squeezes the O-ring 33 into sealed relation with the inner surface of the end 25 of the central aperture 15 as the reduced end 28 is forced against the end 34 of a heating element 35. The heating element 35 may have an enlarged adjacent body 36 to provide a shoulder 37 which abuts the end of the fitting 11 to locate the end 34 within the end 25 and a sloping shoulder 38 at the enlarged aperture portion 16. As the fitting or tube 29 is forced inward in the apertured end 25, the end becomes plastic so that it will flow into the enlarged aperture portion 16 and form a securing head 39 which retains the fitting or tube 29 in sealed relation with the fitting 11 in a manner to permit the relative rotation between the two fittings.

While the fittings or tubes 19 and 29 have been indicated as being constructed from a plastic material, such materials as Nylon, vinyl, acrylic plastics, polyvinyl and the polyalofin plastics can be employed along with other types known in the art to be suitable. It is to be understood that the heating element 35 may be heated by a heating unit within the body 36 connected to an electric circuit the same as a soldering iron and the like or it may be separately heated and inserted into one end of the aperture 15 as the tube 29 is advanced from the other end into engagement therewith. Alternatively, the required heat may be achieved by friction, i.e., rotating a frictional element within the fitting whereby the plastic material will be softened and flow, as indicated above.

What is claimed:

1. A two-piece fitting assembly embodying a first fitting made of metal in the nature of a union having an external thread and a driving tool engaging means, a through aperture on the axis which is enlarged near the center forming an enlarged diameter annular recess, and a plurality of radial slots in the outer periphery of said first fitting for cooling thereof, the second fitting is a tube made of plastic material having a reduced diameter end disposed coaxially within one end of said aperture of said first fitting, said reduced end having an integral cylindrical head extending axially into said annular recess to permanently secure said second fitting against axial removal therefrom but permitting relative rotational movement between said first and second fittings, said head being formed at said reduced end of said tube by inserting said reduced end into said aperture at said one end and forcing said cylindrical head into engagement with a heat generating element inserted within the opposite end of said first fitting and located adjacent to said annular recess within said aperture, whereby said cylindrical head will deform under the influence of heat from said element and flow radially outwardly into and occupy the interior of said annular recess, and an O-ring between said fittings which is compressed to form a seal.

2. A two-piece fitting as recited in claim 1 wherein said aperture comprises a tapered counterbore at said one end, and said O-ring is retained in an annular recess in the outer wall of said tube and is compressed into sealed relation with the inner wall of said aperture by said counterbore as said reduced end of said tube is inserted into said aperture.

3. A two-piece fitting as recited in claim 1 wherein said cylindrical head flows radially outwardly into said annular recess upon engagement of said cylindrical head with a tapered conical portion carried upon said heat generating element under the influence of opposed axial forces applied to said heat generating element and said second fitting.

* * * * *